Oct. 19, 1948. W. F. WILSON 2,451,598
DOUBLE ENGINE TRANSMISSION
Filed Jan. 12, 1944 2 Sheets-Sheet 1
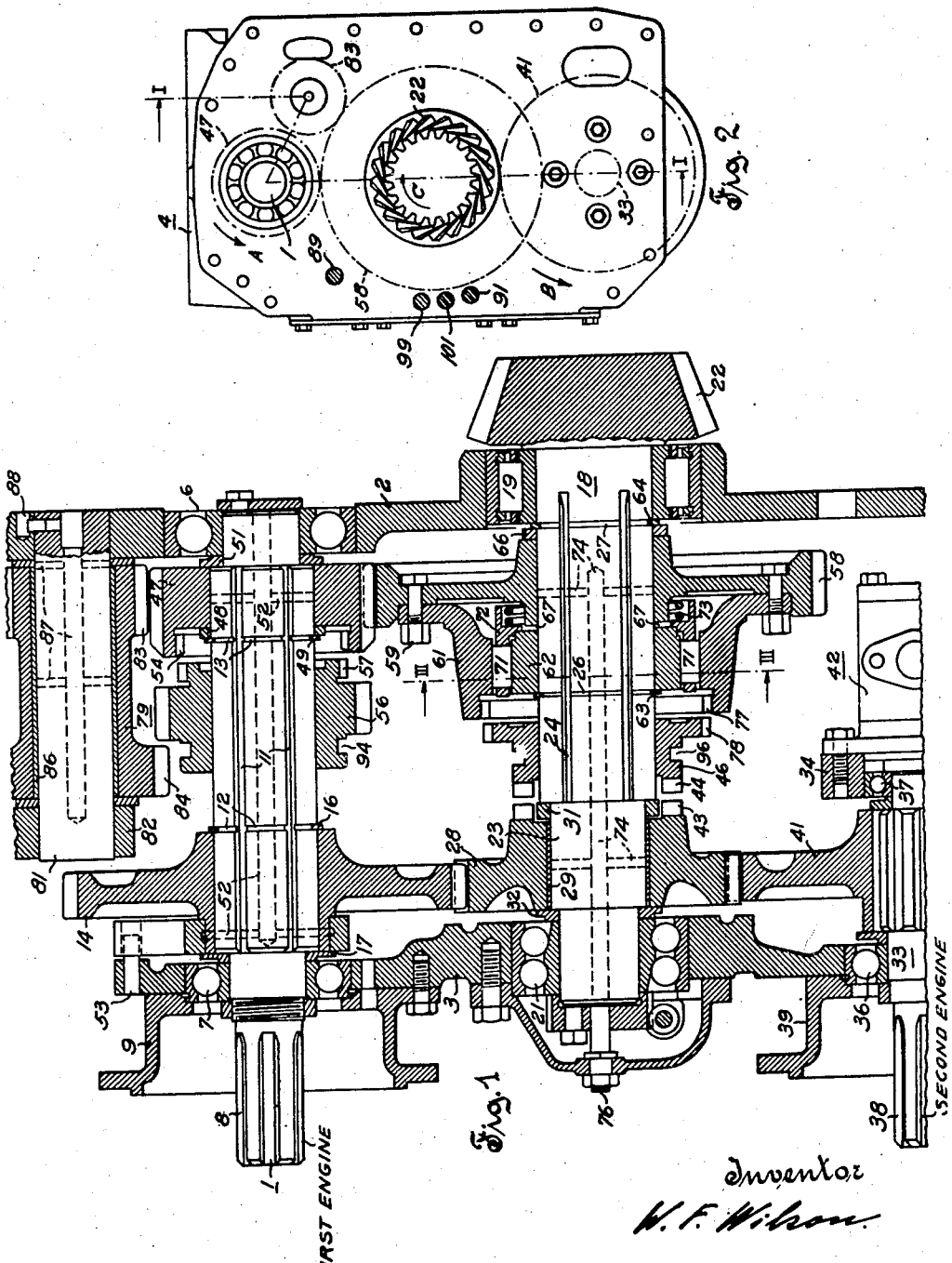

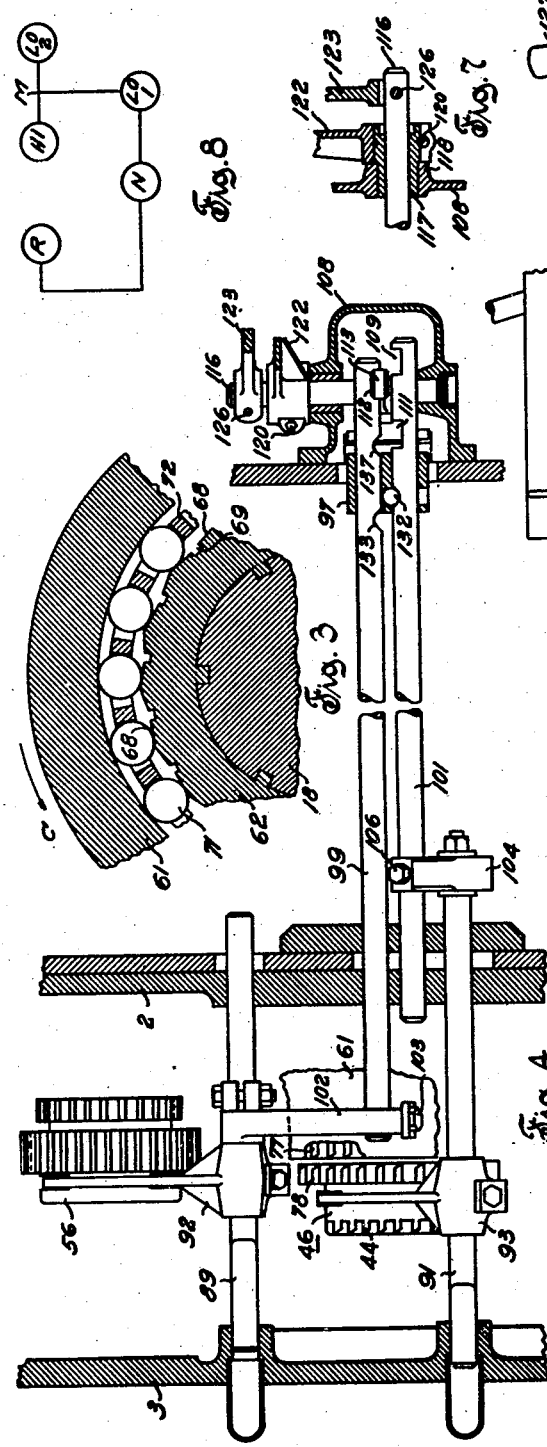

Patented Oct. 19, 1948

2,451,598

UNITED STATES PATENT OFFICE 2,451,598

DOUBLE ENGINE TRANSMISSION

William F. Wilson, Wauwatosa, Wis., assignor to Allis-Chalmers Manufacturing Company, Milwaukee, Wis., a corporation of Delaware Application January 12, 1944, Serial No. 517,941

10 Claims. (Cl. 74—389)

The invention relates to variable speed gearing and it is concerned more specifically with an improved automotive type change speed transmission.

The principal object of the invention is to provide an improved double engine transmission, that is, a transmission adapted to receive power from separate driving engines and having improved change speed gearing for transmitting the combined power of the two engines to a shaft which serves as a single output member of the transmission.

More specifically, it is an object of the invention to provide a transmission of the mentioned character having a driving element connectable with one of the driving engines, change speed gearing for selectively establishing different driving connections between said one driving element and the driven shaft, and another driving element connectable with the other engine and cooperating with the change speed gearing so that upon establishment of any one of the mentioned driving connections the power of both driving engines will be transmitted to the driven shaft through the change speed gearing. In other words, only one change speed gearing, as distinguished from duplicate change speed gearings, will be required for transmitting the combined power of both engines to the driven shaft.

Another object of the invention is to provide a double engine transmission having two driving elements and one change speed gearing, as stated, and in which the change speed gearing affords selectively operable high and low speed drives one of which will be automatically established upon interruption of the other.

Another object of the invention is to provide a driving arrangement for the mentioned change speeding gearing, including an overrunning clutch through which the combined power of both engines will be transmitted to the driven shaft for low speed drive, the overrunning clutch being lockable to permit use of both engines for braking purposes in low gear.

Another object of the invention is to provide a double engine transmission having a lockable overrunning clutch in the low speed drive, as stated, and a reverse speed drive so arranged that the combined power of both engines will be transmitted through the locked overrunning clutch for rotating the driven shaft in reverse.

A further object of the invention is to provide a double engine transmission of the mentioned character in which the change speed gearing is so arranged that the high, low and reverse speed drives may be selected by means of an extremely simple and practically fool-proof control mechanism.

A still further object of the invention is to provide an improved change speed transmission affording high, low and reverse speed drives.

The mechanism for transmitting power from one of the driving engines to the driven shaft, as contemplated by the invention, preferably comprises a rotatable driving shaft, an idler rotatable about an axis spaced from the axis of rotation of the driving shaft and drivingly connected with the driving shaft, and means for alternately transmitting power to the driven shaft either from the idler or from the driving shaft. The second engine has a driving connection with the idler, and by establishing a driving connection between the idler and the driven shaft the combined power of both engines will be transmitted to the driven shaft. The idler is preferably loosely mounted on the driven shaft and a jaw clutch is preferably used for connecting the idler with and disconnecting it from the driven shaft. Engagement of the jaw clutch preferably establishes the high speed drive. Upon disengagement of the jaw clutch the power of the second engine is transmitted through the idler to the driving shaft which is connected with the first engine, and the combined power of both engines may then be transmitted from the driving shaft to the driven shaft through suitable gearing interposed between the driving and driven shafts. The gearing for transmitting the combined power of both engines from the driving shaft to the driven shaft preferably comprises a loose gear on the driven shaft and an overrunning clutch between said loose gear and the driven shaft, which becomes automatically effective to establish the low speed drive upon disconnection of the driven shaft from the idler by disengagement of the jaw clutch. The driven member of the overrunning clutch may be prevented from overrunning its driving member by a suitable locking device which is so arranged that the overrunning clutch can be locked only after the driven shaft has been disconnected from the idler by disengagement of the jaw clutch. The provision of a locking device for the overrunning clutch, as contemplated by the invention, has two purposes. One is to make the braking power of both engines available, for instance in a motor vehicle, upon establishment of the low speed drive, and the other is to permit transmission of reverse driving power from the driving shaft to the driven shaft through the locked overrunning clutch. The loose gear on the driven shaft preferably has a constant mesh driving connection with a reverse idler, and the reverse idler is connectable with and disconnectable from the driving shaft preferably by means of a shiftable selector gear which also serves to control a forward driving connection between the driving shaft and the loose gear on the driven shaft. When the selector gear is moved into its forward drive establishing position the reverse idler is disconnected from the driving shaft, and when the selector gear is moved into its reverse drive establishing position the forward driving connection between the driving shaft and the loose gear on the driven shaft is interrupted. A mechanism for moving the selector gear and operating the locking device is preferably so arranged that the selector gear may be moved to its forward or reverse drive establishing position while the overrunning clutch is unlocked, and so that the overrunning clutch may be locked after the selector gear has been moved either to its forward or to its reverse drive establishing position.

The foregoing and other objects and advantages of the invention will be more fully apparent from the following description of a preferred embodiment of the invention shown in the accompanying drawings. Referring to the drawings, in which like reference characters designate the same or similar parts in the various views:

Fig. 1 is a sectional top view of a transmission along line I—I of Fig. 2;

Fig. 2 is an end view, at a reduced scale, of the transmission shown in Fig. 1;

Fig. 3 is a fragmentary sectional view, at an enlarged scale, on line III—III of Fig. 1;

Fig. 4 is a sectional top view of a shift mechanism for the transmission shown in Fig. 1;

Fig. 5 is a sectional side view of the shift mechanism shown in Fig. 4;

Fig. 6 is a sectional end view of the shift mechanism shown in Fig. 4, taken on line VI—VI of Fig. 5;

Fig. 7 is a sectional detail view on line VII—VII of Fig. 6; and

Fig. 8 is a shift diagram for the mechanism shown in Figs. 4 to 6.

Referring to Fig. 1, the legend "First engine" is applied to a driving shaft 1 to indicate that this shaft is to be connected with a driving engine not shown and which may be assumed to be the internal combustion type. The shaft 1 is journaled in front and rear walls 2 and 3 of a housing generally denoted by the reference character 4, a ball bearing 6 supporting the front end of the shaft 1 being mounted in the front wall 2, and another ball bearing 7 for supporting the shaft 1 being mounted in the rear wall 3 of the housing. The shaft 1 extends rearwardly through the ball bearing 7 and has a splined portion 8 outside of the housing 4 for connection with the first engine. A hydraulic torque converter (not shown) may be assumed to be interposed between the shaft 1 and the crankshaft of the first engine, and in conformity with the usual practice a master clutch (not shown) may also be assumed to be interposed between the first engine and the hydraulic torque converter. The driving shaft 1 is to be alined with the tail shaft of the torque converter and the splined portion 8 is adapted to extend into a hollow internally splined portion of the tail shaft, the external splines of the shaft portion 8 matching the internal splines of the tail shaft to provide a telescopically separable driving connection between the torque converter and the driving shaft 1. An adapter 9 surrounding the rearwardly projecting portion 8 of the driving shaft 1 is bolted to the rear wall 3 of the transmission housing and is suitably flanged for connection with the housing of the torque converter.

The portion of the driving shaft 1 between the ball bearings 6 and 7 has a circumferential series of longitudinally extending splines 11, and two circumferential grooves 12 and 13 are cut into the splines 11. Non-rotatably connected with the driving shaft 1 between the groove 12 and the ball bearing 7 is a gear or driving wheel 14, the hub of this gear having internal splines matching the splines 11, and the gear being retained in an axially fixed position on the shaft 1 by a snap ring 16 placed into the groove 12 and by a thrust washer 17 interposed between the inner race of the ball bearing 7 and the hub of the gear 14.

A driven shaft 18 is journaled in the housing 4 on an axis parallel to the axis of the driving shaft 1, a roller bearing 19 for supporting the driven shaft 18 being mounted in the front wall 2 of the housing, and a double row ball bearing 21 for supporting the rear end of the driven shaft being mounted in the rear wall 3 of the housing. Integrally formed with the driven shaft 18 at the forward end thereof outside of the housing 4 is a spiral bevel gear 22 adapted to mesh with a spiral ring gear of a differential mechanism, not shown, it being understood that the transmission as shown in the drawings is intended for use in a tractor having forwardly located propelling gearing including the mentioned differential mechanism.

The driven shaft 18 has axially alined cylindrical and splined portions 23 and 24, respectively, between the bearings 19 and 21, the diameter of the cylindrical portion 23 being smaller than the outer diameter of the splined portion 24, and a pair of circumferential grooves 26 and 27 are cut into the splines of the portion 24.

Rotatably mounted on the cylindrical portion 23 of the driven shaft 18 is an idler gear 28 having circumferential teeth in mesh with the teeth of the gear wheel 14. The hub of the idler 28 has an axial bore lined with a bushing 29, and the bushing has a running fit on the cylindrical shaft portion 23. A thrust ring 31 surrounds the cylindrical shaft portion at the junction of the splined shaft portion 24 with the cylindrical shaft portion and affords an abutment for limiting forward displacement of the idler relative to the shaft 18. Rearward displacement of the idler is limited by a thrust washer 32 interposed between the inner race of the ball bearing 21 and the hub of the idler 28.

The legend "Second engine" in Fig. 1 is applied to a shaft 33 to indicate that this shaft is to be connected with another driving engine, not shown, and which, like the first driving engine may be assumed to be of the internal combustion type. A stationary bearing bracket 34 is supported within the housing 4 between the front and rear walls 2 and 3, and ball bearings 36 and 37 mounted in the rear wall 3 and in the bracket 34, respectively, support the shaft 33 for rotation about an axis parallel to the axis of the driven shaft 18. The shaft 33 extends rearwardly through the ball bearing 36 and has a splined portion 38 outside of the housing 4 for connection with the second engine. The connection between the shaft 33 and the second engine may be assumed to be an exact duplicate of the connection between the first engine and the driving shaft 1, which has been generally outlined hereinbefore. That is, the shaft 33 is to be alined with the tail shaft of another torque converter connected by means of a master clutch with the second engine, and the splined portion 38 of the shaft 33 is adapted to extend into a hollow internally splined portion of the tail shaft of the second torque converter, the external splines of the shaft portion 38 matching the internal splines of the tail shaft to provide a telescopically separable driving connection between the second mentioned torque converter and the shaft 33. An adapter 39 surrounding the rearwardly projecting portion 38 of the shaft 33 is bolted to the rear wall of the housing 4 and is suitably flanged for connection with the housing of the second mentioned torque converter.

Non-rotatably mounted on the shaft 33, between the ball bearings 36 and 37, is a gear wheel 41 having circumferential teeth in mesh with the teeth of the idler 28. A rotor pump generally designated by the reference character 42 represents auxiliary equipment which may be driven by the shaft 33, the pump being bolted to the bearing bracket 34 and having a driving connection with the shaft 33 at the forward end of the latter. The pump may be used, for instance, to circulate the transmission, differential and torque converters through a cooler.

Referring again to the idler 28, an annular series of axially extending clutch teeth 43 are formed on the hub of the idler at the side thereof facing the splined portion 24 of the driven shaft 18. Another annular series of clutch teeth 44 are formed on a clutch collar 46 which is non-rotatably connected with the driven shaft 18 and shiftable axially thereof, the clutch collar 46 having internal splines matching the external splines on the portion 24 of the driven shaft 18. The clutch teeth 44 are adapted to enter into the gaps between the clutch teeth 43 upon rearward movement of the clutch collar 46 from the position in which it is shown in Fig. 1, and the mentioned rearward movement of the clutch collar 46 will therefore establish a driving connection between the idler 28 and the driven shaft 18. The clutch collar 46 constitutes a control member, and the position occupied by the clutch collar when the clutch teeth 44 are in driving engagement with the clutch teeth 43 will be referred to as "a first position" of the control member.

Assuming that the shafts 1 and 33 are rotated by the first and second driving engines, respectively, in the same direction, as indicated by the arrows A and B in Fig. 2, it will be apparent that the idler 28 is then driven by both engines in the direction of arrow C shown in Fig. 2, and that upon engagement of the clutch teeth 44 with the clutch teeth 43 the combined driving power of both engines will be transmitted to the driven shaft 18. The pitch diameter of the gear 14 is the same as the pitch diameter of the gear 41 and substantially larger than the pitch diameter of the idler 28, and the drive established by engagement of the clutch teeth 44 with the clutch teeth 43 may be referred to as a high speed drive forward.

A low speed drive forward and a reverse speed drive are provided for by means of a forward and reverse drive mechanism which is operatively interposed between the driving shaft 1 and the driven shaft 18, and which is constructed as follows. Rotatively loose on the forward portion of the driving shaft 1 is a forward drive gear 47, this gear having a smooth axial bore of such diameter as to provide a running fit between the cylindrical surface of the bore and the outer cylindrical surface portions of the splines 11. A thrust ring 48 abuts a snap ring 49 placed into the groove 13 of the shaft 1 to limit rearward axial displacement of the gear 47, and a thrust washer 51 is interposed between the gear 47 and the inner race of the ball bearing 6 to limit forward axial displacement of the gear 47. The shaft 1 has axial and radial bores 52 for the delivery of lubricant to the running surface of the gear 47 from an oil inlet 53 in the rear wall 3 of the housing 4. The rear face of the gear 47 is recessed and provided with an annular series of internal clutch teeth 54.

Non-rotatably mounted on the driving shaft 1 between the gears 14 and 47 is a selector gear 56 which is movable axially of the shaft 1 in opposite directions from the position in which it is shown in Fig. 1. The selector gear 56 has a splined axial bore matching the splines 11 of the shaft 1, and an annular series of clutch teeth 57 are formed on the selector gear at the side thereof facing the forward drive gear 47. The clutch teeth 57 are adapted to enter into the gaps between the clutch teeth 54 upon forward movement of the selector gear 56 from the position in which it is shown in Fig. 1, and such forward movement of the selector gear will therefore establish a driving connection between the shaft 1 and the forward drive gear 47. The position occupied by the selector gear 56 when the clutch teeth 57 are in driving engagement with the clutch teeth 54 will be referred to as "a first position" of the selector gear.

The forward drive gear 47 on the shaft 1 meshes with a gear wheel 58 which is rotatively loose on the driven shaft 18, the hub of the gear 58 having a smooth axial bore of such diameter as to provide a running fit between the cylindrical surface of the bore and the outer surface of the splined portion 24 of the driven shaft 18.

Secured to the web of the gear wheel 58 by an annular series of bolts and nuts 59 is a flanged ring 61 which constitutes the driving member of an overrunning clutch between the gear wheel 58 and the driven shaft 18. A cam ring 62 constituting the driven member of the overrunning clutch is non-rotatably secured to the driven shaft 18 in rear of the gear wheel 58, the cam ring 62 having a splined axial bore matching the splines of the shaft portion 24, and a snap ring 63 is placed into the groove 26 of the splined shaft portion 24 to limit rearward axial displacement of the cam ring 62. Another snap ring 64 is placed into the groove 27 of the splined shaft portion 24, and a thrust ring 66 bearing against the snap ring 64 affords an abutment to limit forward axial displacement of the gear wheel 58 and cam ring 63. Rearward axial displacement of the gear wheel 58 is limited by contact of its hub with the front face of the cam ring 62, and a series of radial oil grooves 67 are cut into the rear face of the hub of gear 58.

Referring to Fig. 3, a circumferential series of flats 68 and axial grooves 69 are formed along the periphery of the cam ring 62, and the ring 61 has an internal cylindrical surface radially spaced from the periphery of the cam ring 62. Rotation of the ring 61 in the direction of arrow C in Figs. 2 and 3 is transmitted to the cam ring 62 through a series of rollers 71 arranged within the space between the ring 61 and the cam ring 62. The rollers are resiliently urged into the wedging position in which they are shown in Fig. 3, by a cage 72 and by a helical spring 73 which is shown in Fig. 1. The spring 73 is hooked at one end into a suitable portion of the cage 72 and at the other end into the cam ring 62. A more detailed description of the overrunning clutch comprising the driving and driven members 61 and 62, the rollers 71, cage 72 and spring 73 is believed unnecessary because its principles of operation are well known in the art.

The driven shaft 18 has axial and radial bores 74 for the delivery of lubricant from a supply pipe 76 to the running surfaces of the bushing 29 and of the gear 58 on the shaft 18 and also to the radial oil grooves 67 of the gear 58.

Under certain conditions it is necessary, as will be explained hereinbelow, to lock up the overrunning clutch 61, 62, 71, and for that purpose locking means for said clutch are provided and comprise an annular series of internal clutch teeth 77 which are formed on a skirt portion of the ring 61, and another annular series of clutch teeth 78 which are formed on the clutch collar 46 at the end thereof facing the ring 61. The clutch teeth 78 are adapted to enter into the gaps between the clutch teeth 77 upon forward movement of the clutch collar 46 from the position in which it is shown in Fig. 1, and such forward movement of the clutch collar 46 will lock the overrunning clutch. That is, upon movement of the clutch teeth 78 into clutching engagement with the teeth 77 the driven member 62, which as stated is keyed to the shaft 18, will be prevented from overrunning the driving member 61 of the overrunning clutch. The position occupied by the clutch collar or control member 46 when the clutch teeth 78 are in clutching engagement with the driven member 61 of the overrunning clutch will be referred to as "a second position" of the control member.

A reverse idler 79 is rotatably mounted on a stationary shaft 81 which is supported at its forward end within an opening of the front wall 2 of the transmission housing 4. The rear end of the shaft 81 is supported within a bracket portion 82 of the housing 4 intermediate the front and rear walls 2 and 3. Adjacent to the front wall 2 of the housing the reverse idler 79 has a gear section 83 in constant mesh with the loose gear wheel 58 on the driven shaft 18, the constant mesh relation between the gear section 83 of the reverse idler and the gear 58 being not indicated in Fig. 1 but shown in Fig. 2. Adjacent to the bracket portion 82 the reverse idler has another gear section 84 of such pitch diameter that the selector gear 56 may be brought into mesh with the gear section 84 by rearward movement of the selector gear from the position in which it is shown in Fig. 1. The position occupied by the selector gear 56 when it is in mesh with the gear section 84 of the reverse idler will be referred to as "a second position" of the selector gear.

The axial bore of the reverse idler 79 is lined with a bushing 86, and the stationary shaft 81 has axial and radial bores 87 for the delivery of lubricant from an inlet 88 in the housing wall 2 to the running surfaces of the reverse idler.

When the clutch collar 46 and the selector gear 56 are in the positions in which they are shown in Fig. 1 the transmission is in neutral, and movement of the clutch collar to the rear into clutching engagement with the idler 28 establishes the high speed drive, as has been explained hereinbefore. Assuming now that prior to the movement of the clutch collar 46 into clutching engagement with the idler 28 the selector gear 56 is moved into clutching engagement with the forward drive gear 47, and that the master clutches are held disengaged until the clutch collar 46 is moved into engagement with the idler 28. Upon engagement of the master clutches the transmission will then operate in high, and the gear wheel 58 will be positively driven in the same direction as the idler 28 but at a lower speed than the shaft 18, and the driven member 62 of the overrunning clutch will overrun its driving member 61. It should be noted that the pitch diameter of the forward drive gear 47 is substantially smaller than the pitch diameter of the driving gear 14, and since the gears 14 and 47 rotate at the same speed, under the assumed conditions, it will be obvious that the driven shaft 18 rotates at a higher speed than the gear wheel 58.

A change from high to low gear may be effected by first disengaging the master clutches, then moving the clutch collar 46 from its rearmost position to its neutral position in which it is shown in Fig. 1, while the selector gear 56 remains engaged with the forward drive gear 47, and then reengaging the master clutches. The driving power of the first engine will then be transmitted from the driving shaft 1 through the gears 47, 56, ring 61, rollers 71, and cam ring 62 to the driven shaft 18, and the driving power of the second engine will be transmitted from the shaft 33 through the gear 41, idler 28 and gear 14 to the driving shaft 1. The combined driving power of both engines will therefore be effective to rotate the driven shaft 18 at low speed.

If it is desired to retard the tractor by the braking power of the engines while the transmission is in low gear the overrunning clutch must be locked, that is, the cam ring 62 must be prevented from overrunning the ring 61 in the direction of arrow C in Fig. 3. This may be accomplished by moving the clutch collar 46 into clutching engagement with the ring 61 as has been explained hereinbefore. In this connection, however, the following should be noted. When the high speed driving connection is interrupted by movement of the clutch collar 46 from its position of engagement with the idler 28 to the position in which it is shown in Fig. 1 the combined power of both engines is automatically shunted to the overrunning clutch, and the rollers 71 are wedged between the cam ring 62 and the ring 61 by the driving torque of the engines. The ring 61 and the cam ring 62 then rotate in unison, and the position of the ring 61 circumferentially of the shaft 1 may be such that the clutch teeth 78 do not register with the gaps between the clutch teeth 77, and as a result it would be impossible to move the clutch collar 46 from the position in which it is shown in Fig. 1 forwardly into clutching engagement with the ring 61 while forward driving torque is transmitted to the shaft 18 through the overrunning clutch. However, forward driving torque may be transmitted from the shaft 18 to the clutch collar 46 and to the cam ring 62 of the overrunning clutch upon establishment of the low speed drive, by decelerating the engines momentarily after the vehicle has been accelerated, and during the interval while the vehicle is coasting the clutch collar 46 may readily be moved forwardly into clutching engagement with the ring 61. To facilitate engagement of the clutch teeth 78 with the clutch teeth 77, the relatively adjacent ends of the clutch teeth 77 and 78 may be beveled as indicated in Fig. 4.

For reverse speed drive the selector gear 56 is moved into mesh with the gear section 84 of the reverse idler 79, and the clutch collar 46 is moved into clutching engagement with the ring 61, These adjustments are made while the master clutches are disengaged, and upon engagement of the master clutches the driving power of the first engine will then be transmitted from the driving shaft 1 through gears 56, 84, 83, 58, ring 61 and clutch collar 46 to the driven shaft 18, and the driving power of the second engine will be transmitted from the shaft 33 through gear 41, idler 28 and gear 14 to the driving shaft 1. The combined driving power of both engines will therefore be effective to rotate the driven shaft 18 in reverse.

Referring to Figs. 2 and 4 to 7, the mechanism for shifting the clutch collar 46 and the selector gear 56 is constructed as follows: Two shift rods 89 and 91 are slidably mounted in the upper part of the housing 4, the shift rod 89 having rigidly secured thereto a shift fork 92, and the rod 91 having rigidly secured thereto a shift fork 93. The pronged end of the shift fork 92 embraces the hub of the selector 56, a groove 94 (Fig. 1) for the reception of the prongs of fork 92 being turned into the hub of gear 56 in conformity with usual practice. The pronged end of the fork 93 projects into a circumferential groove 96 (Fig. 1) of the clutch collar 46 between the clutch teeth 44 and 78. A bracket 97 is mounted in front of the housing 4 on a support 98 connected with the housing wall 2, and a pair of selector rods 99 and 101 are slidably supported in openings of the housing wall 2 and in the bracket 97. The selector rod 99 is connected with the shift rod 89 by an arm 102 secured to the shift rod 89 and having an aperture for the reception of the rear end of the selector rod 99. A screw 103 retains the selector rod 99 against axial displacement relative to the arm 102. The selector rod 101 is connected with the shift rod 91 by an arm 104 secured by a screw 106 to the selector rod 101 and having a bore receiving the reduced forward end of the shift rod 91. A nut 107 is threaded upon the forward end of the shift rod 91 to secure the arm 104 against displacement axially of the shift rod 91.

The selector rods 99 and 101 extend forwardly through the bracket 97 into a cap housing 108 mounted on the support 98, and the forward end of the selector rod 101 has notches 109 and 111 (Fig. 4) facing the selector rod 99. The selector rod 99 has a similar notch 112 facing the selector rod 101. As shown in Figs. 4, 5 and 6 the notch 112 accommodates the disk head 113 of an actuating arm 114 which is rigidly secured to a shaft 116 journaled in the lower part of the cap housing 108. The shaft 116 extends through a bushing 117 (Fig. 7) press-fitted into a bearing boss 118 at one side of the cap housing 108, and a reduced end portion of the shaft 116 (Fig. 6) is journaled in another bearing boss 119 at the opposite side of the housing 108. A coil spring 121 surrounding the reduced end portion of the shaft bears against the bearing boss 119 and against a shoulder on the shaft 116, to urge the shaft 116 towards the right in Fig. 6. The tendency of the shaft 116 to move towards the right under the pressure of spring 121 is communicated to the arm 114 and disk head 113, and engagement of the disk head with the selector rod 99 limits the movement of the shaft 116 under the pressure of spring 121.

Rotatably mounted on the bushing 117 and retained thereon against axial displacement by a bolt 120 is a bracket arm 122, and a hand lever 123 is mounted on a head of the bracket arm 122 for pivotal movement about an axis extending at right angles to the axis of shaft 116. The hand lever 123 has alined trunnions 124, one of which is shown in Fig. 6, and the trunnions are seated in open-ended bearing notches in the head of the bracket arm 122. A forked portion at the lower end of the hand lever 123 straddles the outer end of the shaft 116 and is swingably connected therewith by a pivot pin 126. At its upper end the hand lever 123 has a handle 127, and by taking hold of this handle the operator obtains control of the shaft 116 and actuating arm 114, fore and aft movement of the handle 127 being effective to rock the shaft 116 about its axis, and movement of the handle 127 towards the right in Fig. 6 being effective to move the shaft 116 to the left against the pressure of the spring 121.

The position in which the shift mechanism is shown in Figs. 4 to 6 corresponds to the neutral position of the transmission shown in Fig. 1. As shown in Fig. 5, a spring pressed plunger 128 within the bracket 97 engages a notch 129 in the selector rod 101, and as indicated in Fig. 6, another spring pressed plunger 131 similarly engages a notch in the selector rod 99. An interlock ball 132 within the bracket 97 is seated in a notch of the selector rod 101 and bears against the selector rod 99, so that the selector rod 101 cannot be moved from the position in which it is shown in Figs. 4 and 5. Accordingly, the clutch collar 46 is positively retained in the position in which it is shown in Fig. 1, while the shift mechanism is in neutral.

In the shift diagram shown in Fig. 8 the position occupied by the handle 127 when the transmission is in neutral is indicated at N, and from that position the handle 127 may be moved straight forward to the position indicated at LO—1. The result of such movement is that the selector rod 99 is moved to the right in Fig. 4 a sufficient distance to bring the notch 112 opposite to the notch 109, and to bring another notch 133 in the selector rod 99 opposite to the interlock ball 132. Further, the selector gear 56 is moved into clutching engagement with the forward drive gear 47 by the mentioned movement of the handle 127 from the position N to the position LO—1. The transmission is now in condition for forward drive in low gear and the overrunning clutch is unlocked. When the selector rod 99 arrives in the position corresponding to the position LO—1 of the handle 127 the spring pressed plunger 131 (Fig. 6) drops into a notch of the selector bar 99 to retain it in that position.

From the position LO—1 the handle 127 may be moved to the position indicated at HI, such movement first causing axial movement of the shaft 116 against the pressure of spring 121 and then rocking movement of the shaft 116 about its axis. As a result of the axial movement of shaft 116 the disk head 113 of the arm 114 moves from the notch 112 into the notch 109, and as a result of the rocking movement of the shaft 116 the clutch collar 46 moves into clutching engagement with the idler 28. The transmission is then in condition for high speed drive forward. The movement of the selector rod 101 to engage the clutch collar 46 with the idler 28 upon engagement of the selector gear 56 with the forward gear 47 is not obstructed by the interlock ball 132 because the latter is free to enter into the registering notch 133, and when the selector rod 101 is moved in the mentioned direction the interlock ball 132 rides on the full diameter portion of the selector rod 101 and locks the selector rod 99. As a result, the selector gear 56 is positively retained in clutching engagement with the forward drive gear 47 when the transmission is in high gear. When the selector rod 101 arrives in the position corresponding to the position HI of the handle 127 the spring pressed plunger 128 drops into a notch 134 of the selector rod 101 to retain it in that position.

From the position HI the handle 127 may be moved to the position LO—2, the first part of such movement disengaging the clutch collar 46 from the idler 28 and the second part of this movement engaging the clutch collar 46 with the ring 61 of the overrunning clutch. As explained hereinbefore, the selector gear 56 is in clutching engagement with the forward drive gear 47 when the handle 127 is at HI, and the first part of the movement of the handle 127 from the position HI towards the position LO—2 in effect places the transmission in low gear, the driving power of both engines being immediately shunted to the overrunning clutch upon disengagement of the clutch collar 46 from the idler 28. The last part of the movement of the handle 127 towards the position LO—2 locks the overrunning clutch. Movement of the handle 127 from the position HI towards the position LO—2 forces the spring pressed plunger 128 out of the notch 134 of the selector rod 101, and when the handle 127 reaches the middle point M in Fig. 8 the plunger 128 drops into the notch 129. Before proceeding from the point M toward the position LO—2 the operator may accelerate the vehicle and then momentarily decelerate the engines for the purpose explained hereinbefore. When the selector rod 101 arrives in the position corresponding to position LO—2 of the handle 127 the plunger 128 drops into a notch 136 of the selector rod 101 to retain it in said position.

From the position N in Fig. 8 the handle 127 may be moved to the position R in order to establish the reverse speed drive, the movement from N to R first causing rocking movement of the shaft 116 in one direction, then axial movement against the pressure of spring 121 and finally another rocking movement of the shaft 116 in the opposite direction. The first rocking movement of the shaft 116 moves the selector gear 56 into mesh with the gear section 84 of the reverse idler 79, and also brings the notch 112 of the selector rod 99 opposite to the notch 111 of the selector rod 101. Further, the mentioned first rocking movement of the shaft 116 brings a notch 137 in the selector rod 99 opposite to the interlock ball 132 whereby the selector rod 101 is released for shifting movement. The selector rod 99 has another notch (not shown) into which the spring pressed plunger 131 (Fig. 6) may enter to retain the selector rod in the position to which it is moved by the first mentioned rocking movement of the shaft 116.

The axial movement of the shaft 116 during shift from neutral to reverse brings the disk head 113 of the actuating arm 114 from the notch 112 into the notch 111, and the final rocking movement of the shaft 116 during the last part of the shift brings the clutch collar 46 into clutching engagement with the driving member 61 of the overrunning clutch. The plunger 128 is forced out of the notch 129 and enters the notch 136 when the selector rod 101 is moved to lock the overrunning clutch upon meshing engagement of the selector gear 56 with the reverse idler 79.

It will be noted that the shift mechanism shown in Figs. 4 to 7 is operable to move the clutch collar or control member 46 either to its first position in which it engages the idler 28, or to its second position in which it locks the overrunning clutch, upon movement of the selector gear 56 to its forward drive establishing position, and that the shift mechanism is also operable to move the control member 46 to its second position in which it locks the overrunning clutch, upon movement of the selector gear 56 to its reverse drive establishing position.

In general terms, the transmission disclosed herein comprises a driving wheel represented by the gear 14; means including a rotatable driving element represented by the shaft 1, for transmitting power from a driving engine to said driving wheel; an idler represented by the idler 28, which is rotatable about an axis spaced from the axis of rotation of said driving element 1 and which is geared to said driving wheel 14 for rotation thereby under the power of said driving engine in a predetermined direction; means for transmitting power from another driving engine to said idler independently of said driving wheel 14 and operable to rotate said idler under the power of said other driving engine in said predetermined direction, such means being represented by the driving shaft 38 and by the driving gear 41; a rotatable driven shaft represented by the shaft 18; means selectively operable to establish and interrupt a driving connection between the idler 28 and the driven shaft 18, such means being represented by the clutch collar 46 and clutch teeth 43 and 44; and driving means operatively interposed between the driving element 1, and the driven shaft 18, such driving means, in the illustrated embodiment of the invention, comprising the selector gear 56, the forward drive gear 47, clutch teeth 54, 57, reverse idler 79, gear 58, overrunning clutch 61, 62, 71, and lock-up teeth 77, 78 for the over-running clutch.

From a general point of view, it should further be noted that the transmission comprises means for transmitting driving power simultaneously from both driving shafts 1 and 38 at a predetermined speed ratio to the driven shaft 18, such means comprising the driving gears 14, 41, the idler 28 and the selectively engageable and disengageable clutch teeth 43, 44; and means for transmitting driving power simultaneously from both driving shafts 1 and 38 to the driven shaft 18 at another predetermined speed ratio, these latter means comprising the gears 14, 41 and idler 28 in conjunction with means which are operable to establish and interrupt a driving connection between one of the driving shafts 1 and 38 and the driven shaft 18. In the illustrated embodiment of the invention, the mentioned means which are operable to establish and interrupt a driving connection between one of the driving shafts and the driven shaft are incorporated in the gearing which comprises the gears 47, 56, 58 and reverse idler 79, the drive afforded by said gearing being controlled by shifting movement of the selector gear 56 into and out of clutching engagement with the drive gear 47, by shifting movement of the selector gear 56 into and out of mesh with the reverse idler 79, by the overrunning clutch 61, 62, 71, and by the lock-up clutch 77, 78.

While in the foregoing a preferred embodiment of the invention has been disclosed it should be understood that it is not intended to limit the invention to the exact details of construction herein shown and described for various modifications within the scope of the appended claims may occur to persons skilled in the art.

It is claimed and desired to secure by Letters Patent:

1. In a change speed transmission, a driving wheel, means including a rotatable driving element for transmitting power from a driving engine to said driving wheel, an idler rotatable about an axis spaced from the axis of rotation of said driving element and geared to said driving wheel for rotation thereby under the power of said driving engine in a predetermined direction, means for transmitting power from another driving engine to said idler independently of said driving wheel and operable to rotate said idler under the power of said other driving engine in said predetermined direction, a rotatable driven shaft, means selectively operable to establish and interrupt a driving connection between said idler and said driven shaft, and driving means operatively interposed between said driving element and said driven shaft selectively operable to rotate said driven shaft either in said predetermined direction of rotation of said idler or in the opposite direction.

2. In a change speed transmission, a driving wheel, an idler geared to said driving wheel, means including a driving element rotatable about an axis spaced from the axis of rotation of said idler for transmitting power from a driving engine to said driving wheel, means for transmitting power from another driving engine to said idler independently of said driving wheel, a rotatable driven shaft, means including relatively engageable and disengageable drive members operatively interposed between said idler and said driven shaft for rotating said driven shaft in a predetermined direction, and means including an overrunning clutch and gearing associated therewith, operatively interposed between said driving element and said driven shaft for rotating said driven shaft in said predetermined direction upon disengagement of said drive members.

3. In a change speed transmission, a driving wheel, an idler geared to said driving wheel, means including a driving element rotatable about an axis spaced from the axis of rotation of said idler for transmitting power from a driving engine to said driving wheel, means for transmitting power from another driving engine to said idler independently of said driving wheel, a rotatable driven shaft, means including relatively engageable and disengageable drive members operatively interposed between said idler and said driven shaft for rotating said driven shaft in a predetermined direction, means including an overrunning clutch and gearing associated therewith, operatively interposed between said driving element and said driven shaft for rotating said driven shaft in said predetermined direction upon disengagement of said drive members, and locking means for said clutch selectively operable to prevent the driven member thereof from overrunning its driving member.

4. In a change speed transmission, a driving wheel, an idler geared to said driving wheel, means including a driving element rotatable about an axis spaced from the axis of rotation of said idler for transmitting power from a driving engine to said driving wheel, means for transmitting power from another driving engine to said idler independently of said driving wheel, a rotatable driven shaft, a driving connection between said idler and said driven shaft including a control element movable into and out of a drive establishing position, means including an overrunning clutch and gearing associated therewith, operatively interposed between said driving element and said driven shaft for driving said driven shaft from said driving element upon movement of said control element out of its drive establishing position, and locking means for said clutch operatively connected with said control element and operable upon movement of said control element out of said drive establishing position to prevent the driven member of said clutch from overrunning its driving member.

5. In a change speed transmission, a driving wheel, an idler geared to said driving wheel, means including a driving element rotatable about an axis spaced from the axis of rotation of said idler for transmitting power from a driving engine to said driving wheel, means for transmitting power from another driving engine to said idler independently of said driving wheel, a rotatable driven shaft, means including relatively engageable and disengageable drive members for transmitting forward driving power from said idler to said driven shaft, means including an overrunning clutch and disengageable gearing associated therewith for transmitting forward driving power from said driving element to said driven shaft, locking means for said clutch selectively operable to prevent the driven member thereof from overrunning its driving member, and disengageable reverse gearing operatively interposed between said driving element and said driving member of said overrunning clutch, for transmitting reverse driving power to said driven shaft.

6. In a change speed transmission, a pair of rotatable driving shafts adapted, respectively, for connection with separate driving engines, a rotatable driven shaft, constant mesh gearing drivingly interconnecting said driving shafts, including an idler coaxial with and rotatable relative to said driven shaft, a gear wheel rotatively loose on said driven shaft, an overrunning clutch having driving and driven members non-rotatably connected, respectively, with said gear wheel and with said driven shaft, a control element non-rotatably connected with said driven shaft and shiftable axially thereof into clutching engagement either with said idler or with said driving member of said clutch, and gearing adapted to cooperate with one of said driving shafts and with said gear wheel for rotating said driven shaft upon movement of said control element out of clutching engagement with said idler.

7. In a change speed transmission, a pair of rotatable driving shafts adapted, respectively, for connection with separate driving engines, a rotatable driven shaft, constant mesh gearing drivingly interconnecting said driving shafts, including an idler coaxial with and rotatable relative to said driven shaft, a gear wheel rotatively loose on said driven shaft, an overrunning clutch having driving and driven members non-rotatably connected, respectively, with said gear wheel and with said driven shaft, a control element non-rotatably connected with said driven shaft and shiftable axially thereof into clutching engagement either with said idler or with said driving member of said clutch, a disengageable forward drive connection between one of said driving shafts and said gear wheel operable to rotate said driven shaft upon movement of said control element out of clutching engagement with said idler, and a disengageable reverse drive connection between one of said driving shafts and said gear wheel operable to rotate said driven shaft upon movement of said control element into clutching engagement with said driving member of said clutch.

8. In a change speed transmission, a pair of rotatable driving shafts adapted, respectively, for connection with separate driving engines, a rotatable driven shaft, constant mesh gearing drivingly interconnecting said driving shafts including an idler coaxial with and rotatable relative to said driven shaft, a gear wheel rotatively loose on said driven shaft, an overrunning clutch having driving and driven members non-rotatably connected, respectively, with said gear wheel and with said driven shaft, a control element non-rotatably connected with said driven shaft and shiftable axially thereof into clutching engagement either with said idler or with said driving member of said clutch, gearing including selector means movable into a first position for establishing a forward drive connection between one of said driving shafts and said gear wheel and into a second position for establishing a reverse drive connection between one of said shafts and said gear wheel, and mechanism operable to move said control element into clutching engagement either with said idler or with said driving member of said clutch upon movement of said selector means into said first position thereof, and to move said control element into clutching engagement with said driving member of said clutch upon movement of said selector means into said second position thereof.

9. A change speed transmission comprising, in combination, a pair of rotatable driving shafts adapted, respectively, for connection with separate driving engines, a rotatable driven shaft, means for transmitting driving power simultaneously from both of said driving shafts at a predetermined speed ratio to said driven shaft, said means comprising a pair of driving gears non-rotatably secured, respectively, to said driving shafts, an idler permanently geared to said driving gears and rotatively loose on said driven shaft, and selectively engageable and disengageable clutch means operatively interposed between said idler and said driven shaft; and means for transmitting driving power simultaneously from both of said driving shafts, at another predetermined speed ratio to said driven shaft, said last named means comprising said driving gears and idler in conjunction with means operable to establish and interrupt a driving connection between one of said driving shafts and said driven shaft.

10. A change speed transmission as set forth in claim 9 and in which the means which are operable to establish and interrupt a driving connection between one of said driving shafts and said driven shaft comprise another driving gear rotatively loose on said one driving shaft, selectively engageable and disengageable clutch means operatively interposed between said one driving shaft and said other driving gear, and a power transmitting connection between said other driving gear and said driven shaft.

WILLIAM F. WILSON.

REFERENCES CITED

The following references are of record in the file of this patent:

UNITED STATES PATENTS

| Number | Name | Date |
|---|---|---|
| 1,208,751 | Compton | Dec. 19, 1916 |
| 1,809,737 | Staniewicz | June 9, 1931 |
| 1,905,145 | Carter | Apr. 25, 1933 |
| 2,155,434 | Marsh | Apr. 25, 1939 |
| 2,192,078 | Hautzenroeder | Feb. 27, 1940 |
| 2,220,197 | Ariens | Nov. 5, 1940 |
| 2,422,173 | Wilson | June 10, 1947 |